May 30, 1939.  P. V. HUNTER ET AL  2,160,268
METAL ROLLING MACHINE APPLICABLE FOR THE
MANUFACTURE OF ELECTRIC CONDUCTORS
Filed April 28, 1937  3 Sheets-Sheet 1
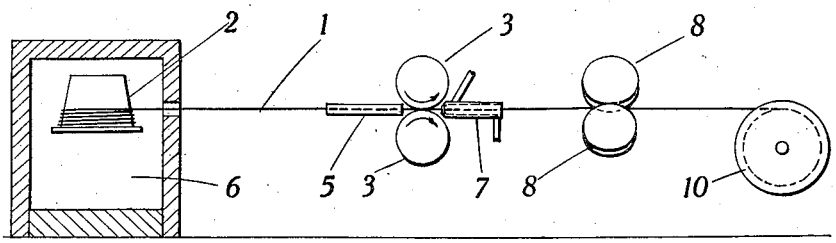
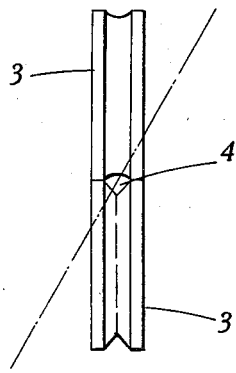
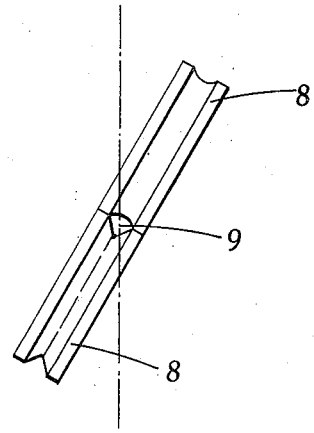
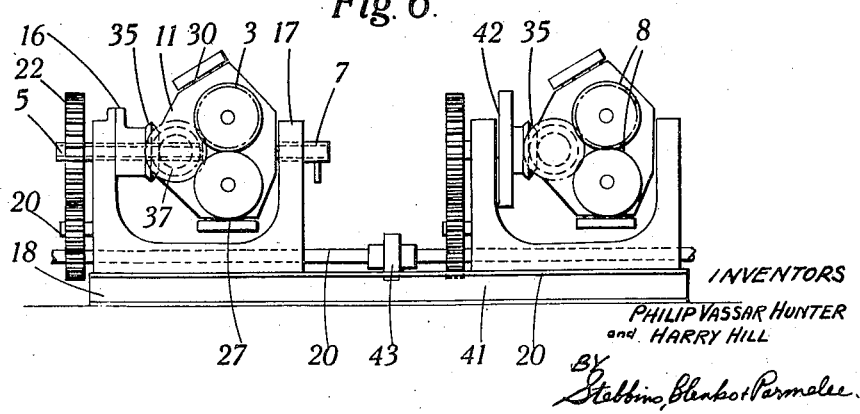
INVENTORS
PHILIP VASSAR HUNTER
and HARRY HILL
BY
Stebbins, Blenko & Parmelee
ATTORNEYS

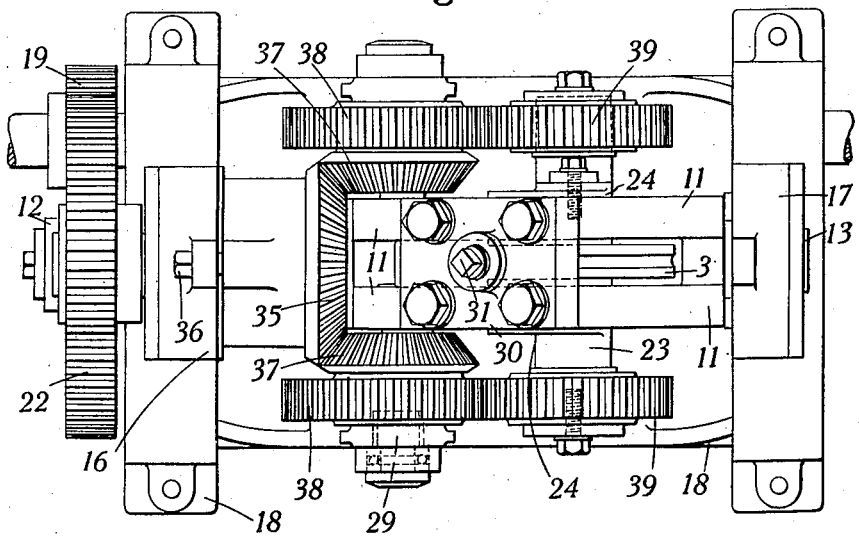
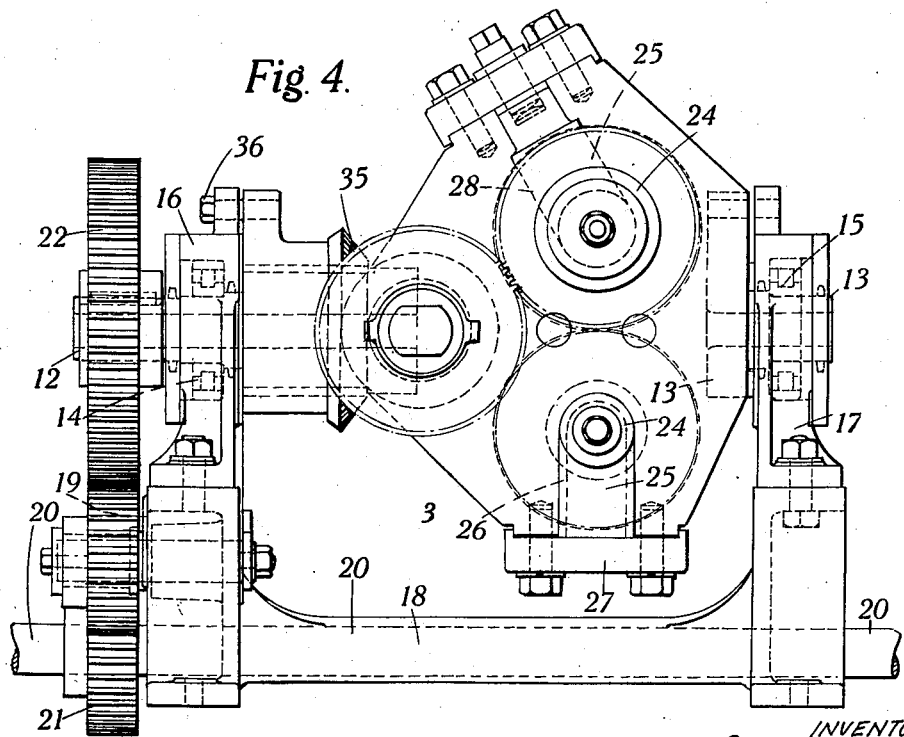

May 30, 1939.  P. V. HUNTER ET AL  2,160,268
METAL ROLLING MACHINE APPLICABLE FOR THE
MANUFACTURE OF ELECTRIC CONDUCTORS
Filed April 28, 1937  3 Sheets-Sheet 3

INVENTORS
PHILIP VASSAR HUNTER
BY and HARRY HILL

ATTORNEYS

Patented May 30, 1939

2,160,268

UNITED STATES PATENT OFFICE 2,160,268

METAL ROLLING MACHINE APPLICABLE FOR THE MANUFACTURE OF ELECTRIC CONDUCTORS

Philip Vassar Hunter, London, and Harry Hill, Belvedere, England, assignors to Callender's Cable and Construction Company Limited, London, England, a British company Application April 28, 1937, Serial No. 139,518 In Great Britain May 9, 1936

3 Claims. (Cl. 80—10)

The invention is concerned with a method of rolling metal. It is primarily intended for the production of conductors for use in the manufacture of multi-core electric cables. The product is a non-circular rod or wire which has a cross-section of a shape and dimensions which are the same at all points in the length but which changes its angular position continuously and at a uniform rate along the rod. The general appearance of the product is that of a twisted rod, but the method of manufacture is such that there is no twisting of the rod as a whole, but only displacements of portions of the metal. For the sake of brevity the product will hereinafter be termed a pre-spiralled, shaped, solid conductor and it will be understood that this term includes products of similar form which may be suitable for purposes other than that of electric cable manufacture. One form of the product is a rod having a cross-section of sector shape with more or less rounded corners. If three of these rods having a sector angle of about 120 degrees are used in the manufacture of a three-core cable they can, after the application of a layer of insulating material to each of them, be laid up together helically without any necessity for twisting the cores and with the application of only small forces in assembly the three cores together. This indicates that the shape of the rod is a close approximation to the helix in which the rod is finally laid up. This example is mentioned because the three-core cable is the principal form in which it is expected that rods made in accordance with the invention will be employed. In this form the sector shape may be replaced by an oval shape approximating to it.

In general the rate of angular displacement of the shape of the cross-section as it travels along the rod will be small corresponding to the relatively long lay usually adopted for the cores of multicore cables.

In accordance with the present invention the rod is conveyed to rolls which give it the desired cross-section and helical form simultaneously. For this purpose the rolls, in addition to being driven in such a way as to rotate about their axes and thereby propel the rod through the space between them, are rotated, generally at a slower anguluar rate, about a longitudinal axis within the rod. Accordingly the rolls change the form of the cross-section of the rod and cause this form to rotate continuously about an axis in the rod as it progresses along that axis.

The invention will be more fully described with the aid of the accompanying drawings which illustrate methods of, and show examples of apparatus for, producing pre-spiralled solid conductor in accordance with the present invention. In the drawings Figure 1 is a diagrammatic elevation of the complete apparatus, Figure 2 is an end elevation of the first pair of rolls of the apparatus shown in Figure 1, Figure 3 is an end elevation of the second pair of rolls, Figure 4 is a side elevation of single stage rolling machine.

Figure 5 is a plan of the machine shown in Figure 4,

Figure 6 is a diagrammatic elevation of a two-stage rolling machine, and

Figure 7:
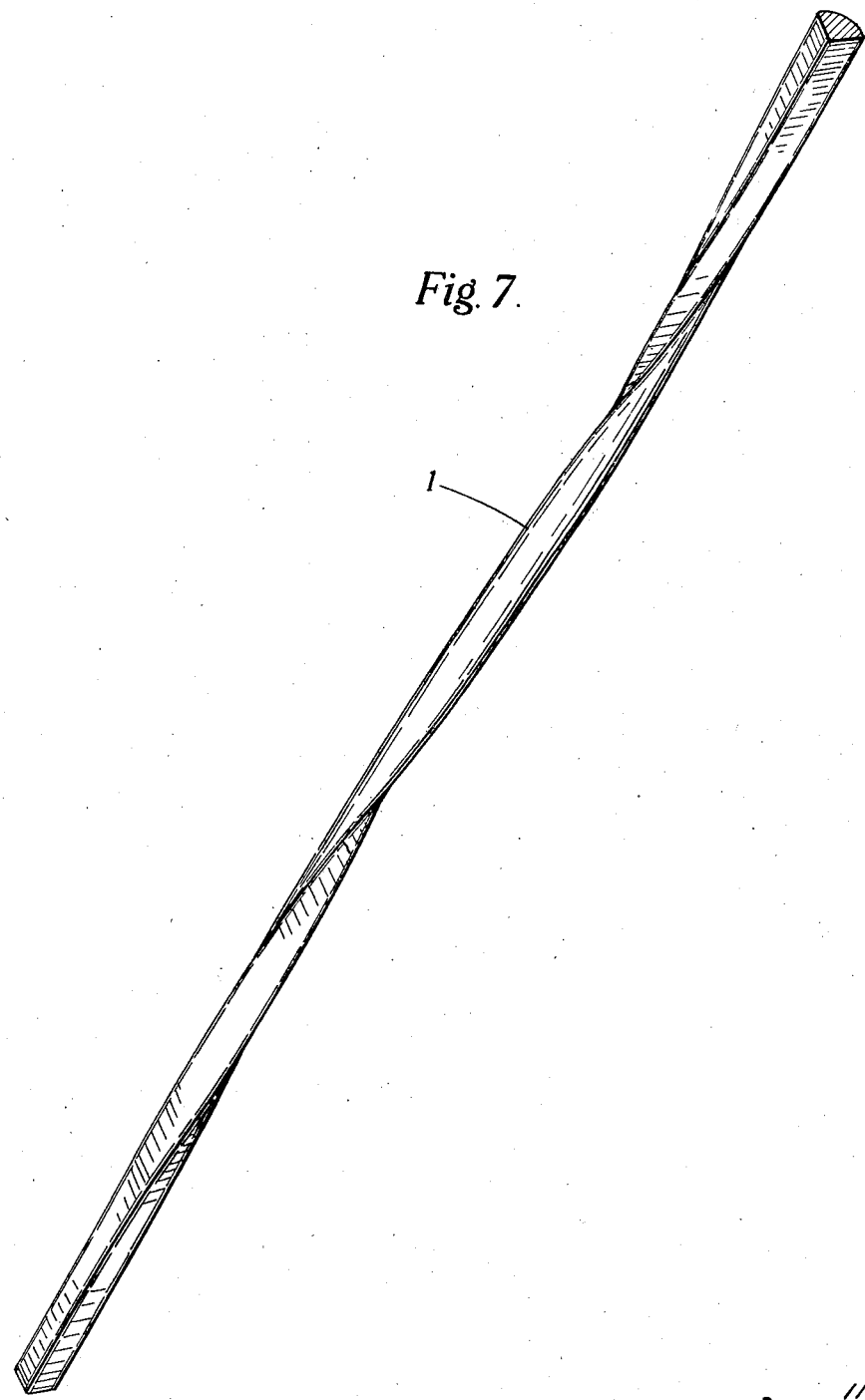
Figure 7 is a perspective view on an enlarged scale of a length of conductor of the kind produced by the machine shown in Figure 1.

Referring first of all to Figures 1, 2, and 3 only, it will be seen that the rod 1 is drawn off from a supply reel 2 and led to a pair of rolls 3 which are rotated about their respective axes and also about an axis within the rod 1. The co-operating parts of the surfaces of the rolls 3 are shaped in such a way as to form between them an aperture 4 of the shape to be given to the rod by the first stage of the rolling process, or in cases where the change from the initial to the final form of the rod is made in a single stage of the final shape to be given to the rod. The rod 1 may be initially of circular form or it may be of a form making some small departure from the circle, for instance, it may be hexagonal. In the latter case the rod preferably passes to the rolls 3 through a tubular guide 5 which is of corresponding internal shape. This is placed immediately adjacent to the rolls 3 so as to support the rod close to the point where it enters the rolls. Such a guide will resist any tendency for the rod to be twisted due to the rotation of the rolls about the rod. The metal may be rolled either hot or cold. In the former case the supply reel may be housed in a suitable heating furnace 6 and pass into the rolls 3 whilst hot. This will permit of these rolls exerting a greater deformation or, alternatively, of being made of lighter construction. Where the rod is of copper it is an advantage to subject the rod to a quenching action as it emerges from the rolls 3 by passing it through a cooling tube 7 through which water or other suitable cooling fluid is continuously circulated. This results in the work hardened rod becoming annealed before passing into the rolls 8 which perform the second stage of the rolling operation. These rolls are also driven and are rotated at the same speed as the rolls 3 about an axis that is coincident with the axis about which the rolls 3 are rotated. Naturally the shape of the aperture 9 formed by the rolls 8 will be slightly different from that of the aperture 4 and will correspond to the final shape to be given to the rod 1. It will be noticed that rolls 3 are disposed at an angle of about 30° to the rolls 8. This is to allow for the fact that the first pair of rolls have rotated through this angle whilst the rod has travelled from the first to the second pair of rolls. The angular setting of the second pair of rolls must therefore be adjustable to permit of the manufacture of products of different helical pitch. From the second pair of rolls 8 the finished rod passes to a take-up reel 10 which may be driven in the usual way through a slipping coupling.

In the example of rolling machine shown in Figures 4 and 5, a pair of shaped rolls 3 are mounted in a frame constituted by a pair of spaced, parallel side walls 11 united at the feed and delivery ends by hollow trunnion members 12 and 13 respectively. These trunnions are respectively supported in roller bearings 14 and 15 housed in bearing pedestals 16 and 17 which are mounted on the bed plate 18. The axis of the trunnions and their bearings passes through the aperture between the rolls 8 so that the rolls may be rotated about an axis that lies within the rod and is preferably coincident with the axis thereof. The roll frame is driven by a pinion 19 on the driving shaft 20 through an intermediate pinion 21 and a spur wheel 22 keyed on the projecting end of the trunnion 12. Each roll 3 is detachably mounted on its roll shaft 23 and the rolls are preferably interchangeable so as to facilitate the use of the machine for conductors of different sizes. Each roll shaft is supported in bearings 24 in the extremities of the limbs of a U shaped member 25, the side walls of the frame being slotted to accommodate the limbs of the member. In the case of one of the rolls (the lower one as seen in Figure 4) the slots 26 (Figure 5) are normal to the axis of rotation of the frame and the position of the lower roll 3 is fixed, the U shaped member 25 being held in place by a cap 27 bolted to the side walls of the frame. In the case of the upper roll, however, the slots 28 are, for reasons to be explained later, normal to a plane containing the axis of that roll and the axis of the stub shafts 29 projecting outwardly, one from each side wall of the frame and provision is made for a small adjustment of the upper roll by moving the U shaped member 24 in which it is mounted up or down the inclined slots in the frame walls. To this end the frame is bridged by a cap member 30 which carries a set screw 31 which bears upon a domed surface 32 on the base of the U shaped member 25. This arrangement ensures that the pressure on the roll is correctly distributed. The rolls are driven by the rotation of the frame but at an angular velocity substantially greater than that of the frame. This is effected by means of a bevel gear wheel 35 that is mounted on the trunnion 13 but is restrained from rotating with it by being anchored by a screw 36 to the bearing pedestal 16. In engagement with this bevel wheel are a pair of bevel pinions 37 rotatably supported one on each of the stub shafts 29. Each bevel pinion 37 drives a spur wheel 38 mounted on the same shaft and each spur wheel 38 drives a spur wheel 39 mounted on one of the roll shafts. It will now be appreciated that owing to the inclination of the slots 28 housing the bearing member for the upper roll, this roll can be adjusted without causing under-engagement or over-engagement of the teeth of the spur wheels 38 and 39 driving it. Both pairs of spur wheels 38 and 39 are constructed as change wheels for the purpose of adjusting the gear in order to vary the length of lay of the product.

It will be appreciated that the drive to the rolls may be effected in other ways. For instance instead of having a separate drive from the stationary bevel wheel to each roll in the frame, a single drive may be employed in combination with bearing connecting together the roll shafts. Instead of a fixed bevel wheel a spur wheel may be used, whilst the transmission from the wheel engaging the fixed wheel to the roll shaft may be by worm, bevel, skew or any other convenient gearing.

Figure 6 shows an example of a two-stage rolling machine built up from two machines of the kind described with reference to and shown in Figures 4 and 5. These machines are mounted on a common bed-plate 41 and are driven from a common driving shaft. In the case of the second machine the transmission of the drive to the rolls is preferably such that the rolls tend to rotate at a higher speed than the rolls of the first machine and the fixed wheel 35 is anchored through a slipping coupling 42. This ensures that the second stage of the machine will always take up the product from the first stage as fast as it is delivered without, however, stretching it to any undesired extent in so doing.

To permit of adjustment of the angular setting of the two pairs of rolls an adjustable coupling 43 is inserted in the common driving shaft 20. This can be disengaged temporarily to permit the second half of the driving shaft to be rotated relative to the first by an amount necessary to bring the two sets of rolls 3 and 8 to the correct setting for the particular length of lay required in the conductor to be manufactured.

In the above description frequent reference has been made to pairs of rolls but it will be understood that more than two rolls may be employed in each stage of the machine, for instance three at an angle of 120° to one another.

What we claim as our invention is:

1. Apparatus for the manufacture of pre-spiralled, shaped, solid conductor from rod of circular or other convenient cross-section, comprising a plurality of rolls which are shaped on the co-operating parts of their surfaces to form an aperture of the cross-sectional shape to be given to the rod, means for driving the said rolls about their respective axes whereby to advance the rod through the aperture and control the speed of its advance, and means for producing relative rotation between each of said rolls and the rod about a longitudinal axis within the rod and at a speed predetermined relative to the speed at which the rolls are driven in rotation about their respective axes.

2. Apparatus for the manufacture of pre-spiralled, shaped, solid conductor from rod of circular or other convenient cross-section, comprising a plurality of rolls which are shaped on the co-operating parts of their surfaces to form an aperture of the cross-sectional shape to be given to the rod, means for driving the said rolls about their respective axes thereby to advance the rod through the aperture and control the speed of its advance, means for driving said rolls in rotation about a longitudinal axis within the rod at a predetermined speed relative to the speed at which the rolls are driven in rotation about their respective axes, and means for anchoring the rod against rotation about a longitudinal axis therein.

3. Apparatus for the manufacture of pre-spiralled, shaped, solid conductor from rod of circular or other convenient cross-section, comprising a plurality of rolls which are shaped on the co-operating parts of their surfaces to form an aperture of the cross-sectional shape to be given to the rod, means for driving the said rolls about their respective axes thereby to advance the rod through the aperture and control the speed of its advance, a supply reel from which the rod is drawn off by said rolls, a take-up device in advance of said rolls for receiving the rod from said rolls, and means for imparting relative rotation, about a longitudinal axis within the portion of the rod passing through said rolls and at a speed predetermined relative to the speed of rotation of said rolls about their respective axes, between said rolls on the one hand and said supply reel and take-up device on the other hand.

4. Apparatus for the manufacture of pre-spiralled, shaped, solid conductor from rod of circular or other convenient cross-section, comprising a plurality of rolls which are shaped on the co-operating parts of their surfaces to form an aperture of the cross-sectional shape to be given to the rod, means for driving the said rolls about their respective axes thereby to advance the rod through the aperture, a supply reel from which the rod is drawn off by said rolls, a take-up reel in advance of said rolls for receiving rod from said rolls, means for driving said take-up reel, means for proportioning the power supplied to said rolls and said take-up reel whereby the advance of the rod through the said rolls is controlled by said rolls, and means for imparting relative rotation, about a longitudinal axis within the portion of the rod passing through said rolls and at a speed predetermined relative to the speed of rotation of said rolls about their respective axes, between said rolls on the one hand and said supply reel and take-up device on the other hand.

5. Apparatus for the manufacture of pre-spiralled, shaped, solid conductor from rod of hexagonal or other suitable cross-section comprising a plurality of rolls shaped on the co-operating parts of their surfaces to form an aperture of the cross-sectional shape to be given to the rod, means for driving the said rolls about their respective axes thereby to advance the rod through the aperture and control the speed of its advance, a tubular guide for said rod located to the rear of said rolls and having an internal cross-section corresponding to the cross-sectional shape of the rod, a take-up device in advance of said rolls for receiving rod delivered by said rolls, and means for rotating said rolls relative to said tubular guide and said take-up device about a longitudinal axis within the rod passing through said rolls and at a speed predetermined relative to the speed of rotation of said rolls about their respective axes.

6. Apparatus for manufacturing pre-spiralled, shaped, solid conductor from rod of circular or other suitable cross-section, which comprises at least two axially aligned sets of rolls each of which sets comprises at least two rolls which co-operate to form an aperture of the cross-sectional shape to be given to the rod by that set of rolls, means for driving each of the rolls of the first set in rotation about its axis whereby to advance the rod through the aperture thereof, means including a slipping coupling for driving the rolls of the second set in rotation about their respective axes, a supply reel from which the rod is drawn off by the first set of rolls, a take-up device in advance of the second set of rolls for receiving rod from the second set of rolls, and means for imparting relative rotation, about a longitudinal axis within the portion of the rod passing through said sets of rolls and at a speed predetermined relative to the speed of rotation of the rolls of the first set about their respective axes, between said sets of rolls, on the one hand, and said supply reel and take-up device, on the other hand.

7. Apparatus for the manufacture of pre-spiralled, shaped, solid conductor from hot copper rod, comprising a set of rolls which are shaped on the co-operating parts of their surfaces to form an aperture of the cross-sectional shape to be given to the rod by that set of rolls, means for driving the said rolls about their respective axes to advance the rod through the aperture and control the speed of its advance, means for heating the rod prior to its introduction into said rolls, means located in advance of said rolls for annealing the rod delivered thereby, a second set of rolls comprising at least two rolls which co-operate to form an aperture of the cross-sectional shape to be given to the rod by that set of rolls, means including a slipping coupling for driving the rolls of the second set about their respective axes, a take-up device for receiving the rod as it issues from second set of rolls, and means for causing both sets of rolls to rotate relative to said heating means and said take-up device about a longitudinal axis passing through the apertures in said sets of rolls and at a speed predetermined relative to the speed of rotation of the rolls of the first set about their respective axes.

8. A process for the manufacture of a multi-core electric cable conductor of non-circular cross-section and of pre-spiralled form from a rod of circular or other convenient cross-section, which comprises progressively applying to a length of the rod a rolling pressure which at any instant of time is exerted over substantially the entire circumference of the rod in the zone of pressure, whereby to impart to the rod the required cross-sectional shape and rotating the direction of applied pressure gradually relative to the rod and about a longitudinal axis within the rod as the lines of application of said pressure are advanced along the length of the rod.

PHILIP VASSAR HUNTER.
      HARRY HILL.